United States Patent

Yoshii et al.

Patent Number: 5,253,579
Date of Patent: Oct. 19, 1993

[54] RUBBER STAMP, MANUFACTURING DEVICE THEREFOR, AND METHOD OF MANUFACTURE THEREFOR

[75] Inventors: Yoshitaka Yoshii, 5-11-23, Tokugyo, Kofu-shi, Yamanashi-ken; Ichiro Suzuki, Kofu, both of Japan

[73] Assignee: Yoshitaka Yoshii, Kofu, Japan

[21] Appl. No.: 835,127

[22] Filed: Feb. 12, 1992

[30] Foreign Application Priority Data

Feb. 13, 1991 [JP] Japan .................................. 3-41247
Feb. 13, 1991 [JP] Japan .................................. 3-41248

[51] Int. Cl.$^5$ ............................................... B41C 1/00
[52] U.S. Cl. ...................................... 101/401.1; 409/135; 101/395
[58] Field of Search ................ 101/401.1, 395; 409/131, 134, 135; 156/247, 344; 427/154

[56] References Cited

U.S. PATENT DOCUMENTS

| | | | |
|---|---|---|---|
| 744,852 | 11/1903 | Amstutz | 101/401.1 X |
| 1,899,775 | 2/1933 | Schnable | 101/401.1 X |
| 2,010,905 | 8/1935 | Tretbar, Jr. | 101/401.1 |
| 2,332,003 | 10/1943 | New | 101/401.1 X |
| 2,738,730 | 3/1956 | Boyajean | 101/401.1 |
| 3,162,090 | 12/1964 | Vosburg | 409/135 |
| 3,549,448 | 12/1970 | Dearing | 427/154 X |
| 3,991,673 | 11/1976 | Coale et al. | 101/401.1 X |
| 4,744,851 | 5/1988 | Lorenz | 156/247 X |
| 4,943,467 | 7/1990 | Shuji | 101/401.1 X |

FOREIGN PATENT DOCUMENTS 0162352  7/1986  Japan ............................. 101/401.1

Primary Examiner—Edgar S. Burr
Assistant Examiner—Christopher A. Bennett
Attorney, Agent, or Firm—Biebel & French

[57] ABSTRACT

A cushion layer 92 made of plastics or rubber is fixed on a stamp body 90, on which a peelable layer 94 having a certain thickness and formed by a rubber having a glass-transition temperature higher than −50 degrees Celsius, is temporarily fixed, and further, a protective film 96 is temporarily fixed on the peelable layer 94. Next, to form an image section, the peelable layer 94 is cooled to a temperature below its glass-transition temperature, the peelable layer 94 and protective film 96 being cut along a boundary line 116 between the engraving region on which images on the peelable layer 94 are engraved and the blank region other than the engraving region, and the area other than the image on the engraving region being cut and removed so deep that the peelable layer will not be cut. Further, the peelable layer 94 corresponding to the blank region is peeled off along a cutting line 108 so that the peelable layer on the engraving region on which the image section 106 is engraved is left on the cushion layer, whereas the protective film 96 on the image section 106 is removed.

11 Claims, 13 Drawing Sheets

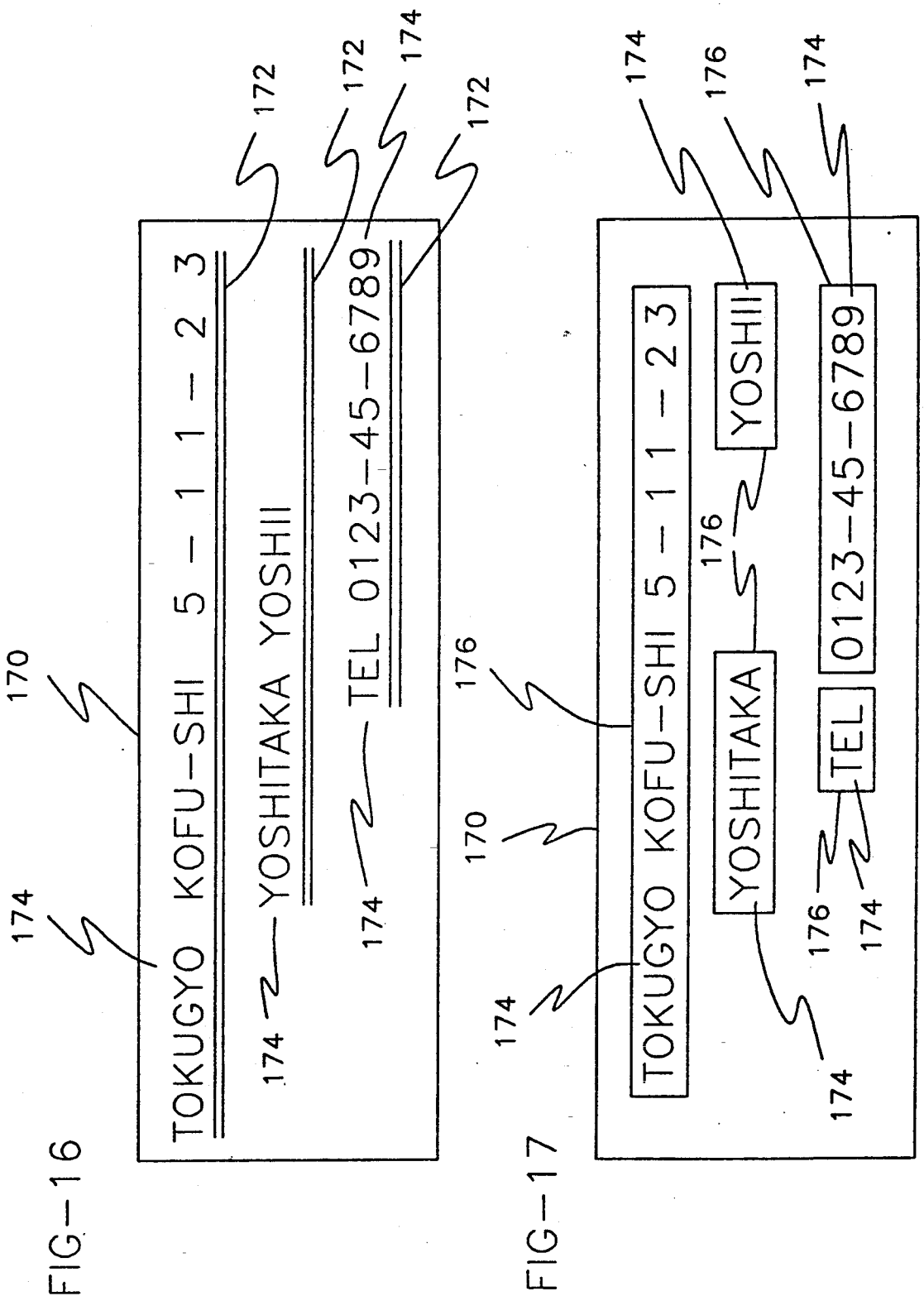

RUBBER STAMP, MANUFACTURING DEVICE THEREFOR, AND METHOD OF MANUFACTURE THEREFOR

BACKGROUND OF THE INVENTION

1. Field of the Invention

The present invention relates to a device for manufacturing rubber stamps that forms images by engraving a rubber material while the rubber is being cooled, a method of manufacturing thereof, and a rubber stamp body used therefor.

2. Background Art

The following processes have been employed conventionally in manufacturing rubber stamps.

First, letter artwork for a rubber stamp is made using a photo-composing machine in a dark room; the letter artwork is affixed on a wood block for the rubber stamp in order that proofreading may be performed, and then the image of the letter artwork is recorded on a letterpress printing film using a process camera. Next, using this letterpress printing film, a letterpress resin is exposed and developed to produce a relief, the relief being used to make a mother die using a press machine. Then, the rubber stamp body is heated and softened, press-formed using the mother die, and fixed on the wood block to complete the rubber stamp.

However, this method requires complex processes and a great number of pieces of equipment and numerous facilities, resulting in high manufacturing cost and low productivity. Product delivery may take up to 10 to 15 days after the customer's order is received, making it impossible to meet rush orders. The method also requires professional technicians because the process requires the technique of photo-composing and letterpress production.

When a stamp body made of hard materials is used, automatic engraving is attempted on some parts using a rotating cutter in place of conventional manual engraving. However, engraving rubber materials using such automatic engraving equipment has not been done industrially. The inventors of the present invention attempted engraving rubber materials using automatic engraving equipment of this kind, but the effort ended in vain with no clear stamp images obtained: the rubber material was deformed due to its elasticity when the rotating cutter was used on the rubber material.

SUMMARY OF THE INVENTION

The present invention was conceived in view of the above circumstances, with its first object being to manufacture rubber stamps at an acceptable rate of productivity, at low cost, and within a short time. In order to achieve this object, the first method of manufacturing rubber stamps according to the present invention cools and hardens a rubber material constituting the rubber stamp body to a temperature below the glass-transition temperature of the rubber material, which is then engraved by a rotating cutter. This method eliminates such problems as the rubber sticking to and damaging the cutter, and in accurate engraving, avoids problems due to elastic deformation of the rubber, and as such constitutes an efficient engraving method.

The second objective of the present invention is to shorten the time required to engrave the rubber material. In order to achieve this objective, according to the second method of manufacturing a rubber stamp of the present invention, a cushion layer made of plastics or rubber and having flat edges is fixed on a stamp body, and a peelable layer made of rubber with a constant thickness is fixed on the cushion layer via an adhesive agent layer. Next, the peelable layer is cooled to a temperature below its glass-transition temperature, the peelable layer is cut along a boundary line between the engraving region on which images are engraved over the peelable layer and the blank region other than the engraving region, and the engraving region is cut and removed such that the peelable layer will not be cut, to form an image section. Further, the peelable layer corresponding to the blank region is peeled off from the cushion layer along the boundary line, so that the peelable layer on the engraving region on which the image section is engraved remains on the cushion layer. According to this second method, engraving work which usually requires a relatively long time is limited only to the engraving region, and the rubber stamp manufacturing process is thus hastened.

The third objective of the present invention is to provide equipment for manufacturing the rubber stamp, which is suitable for the above-mentioned first and second methods. In order to achieve this objective, the rubber stamp manufacturing equipment according to the present invention consists of a stamp body retaining mechanism that fixes the rubber stamp body such that it can later be removed, a mechanism that rotates a cutter around its axial line (arranged vertically to the stamp face of the rubber stamp body), a Z-direction movement mechanism that moves either the stamp body retaining mechanism or the cutter rotating mechanisms in a direction either toward or away from the other mechanism, an X-Y-movement mechanism that moves either the stamp body retaining mechanism or the cutter rotating mechanism in a direction perpendicularly to the Z axis, and a cooling mechanism that cools the rubber stamp body fixed on the stamp body retaining mechanism to an engraving temperature lower than its glass-transition temperature. Using this equipment, precise engraving work can be performed while the rubber material of the rubber stamp body is cooled, and each mechanism is automatically controlled by a computer.

The fourth objective of the present invention is to provide equipment that can automatically set the location of the boundary line when carrying out the second method of the present invention. In order to achieve this objective, the second equipment of the present invention consists of, in addition to the configuration of the first equipment, a stamp face dimension inputter to input dimensional information of the stamp face on the rubber stamp body, a stamp face information inputter to input information on the image to be engraved on the stamp face, a boundary line calculator to determine the engraving region on which the image section on the stamp face is to be formed, based on the dimensional information and image information, and, at the same time, to calculate the location data for the boundary line between the engraved region and the blank region other than the engraved region, an engraving-region cutting-data retainer to retain the cutting location data for the area other than the image section in the engraving region, a boundary line data retaining mechanism to retain the location data for the boundary line, and a controller to control the cutter rotating mechanism, the Z-direction movement mechanism and the X-Y- direction movement mechanism in such a manner that the area other than the image section within the engraving region is cut to a first depth based on the cutting location data read out from the engraving region cutting data retainer, and the blank region is cut along the boundary line to a second depth which is deeper than the first depth, based on the boundary location data read out from boundary data retainer.

According to this second equipment configuration, using the boundary line calculator, the boundary line location is automatically calculated from the inputted letter information, the stamp face dimensional information and the layout information, so that the most adequate boundary location can be determined, the engraving time is kept to a minimum, and equipment operation is simplified.

The fifth objective of the present invention is to provide a rubber stamp body suitable for the second method of the present invention. This rubber stamp body consists of a stamp body, a cushion layer made of plastics or rubber having flat edges and fixed on the stamp body, and a peelable layer fixed peelably on the cushion layer, having a constant thickness and formed of a rubber having a glass-transition temperature higher than −50 degrees Celsius. According to this rubber stamp body, it is easy to peel off the peelable layer from the cushion layer in the area corresponding to the blank region (which does not include letters), and to leave on the cushion layer only the peelable layer corresponding to the engraving region on which the image is engraved.

The sixth objective of the present invention is to improve the distinctness of the image on the rubber stamp. In order to do this, a protective film is applied temporarily to the engraving face of the rubber stamp body. Thus arranged, it is possible to attain the effect that the peelable layer can be kept cool after a coolant is sprayed, and the protective film prevents the edges of the peelable layer from being finely chipped or broken, and prevents burrs from being generated, thus forming an image with a clear and distinctive contour.

BRIEF DESCRIPTION OF THE DRAWINGS

FIG. 16 is an output screen with letter information input in the method for manufacturing rubber stamps.

FIG. 17 is an output screen with the engraving region, blank region and boundary line determined in the method for manufacturing rubber stamps.

DETAILED DESCRIPTION OF THE PREFERRED EMBODIMENTS

Figure 1:
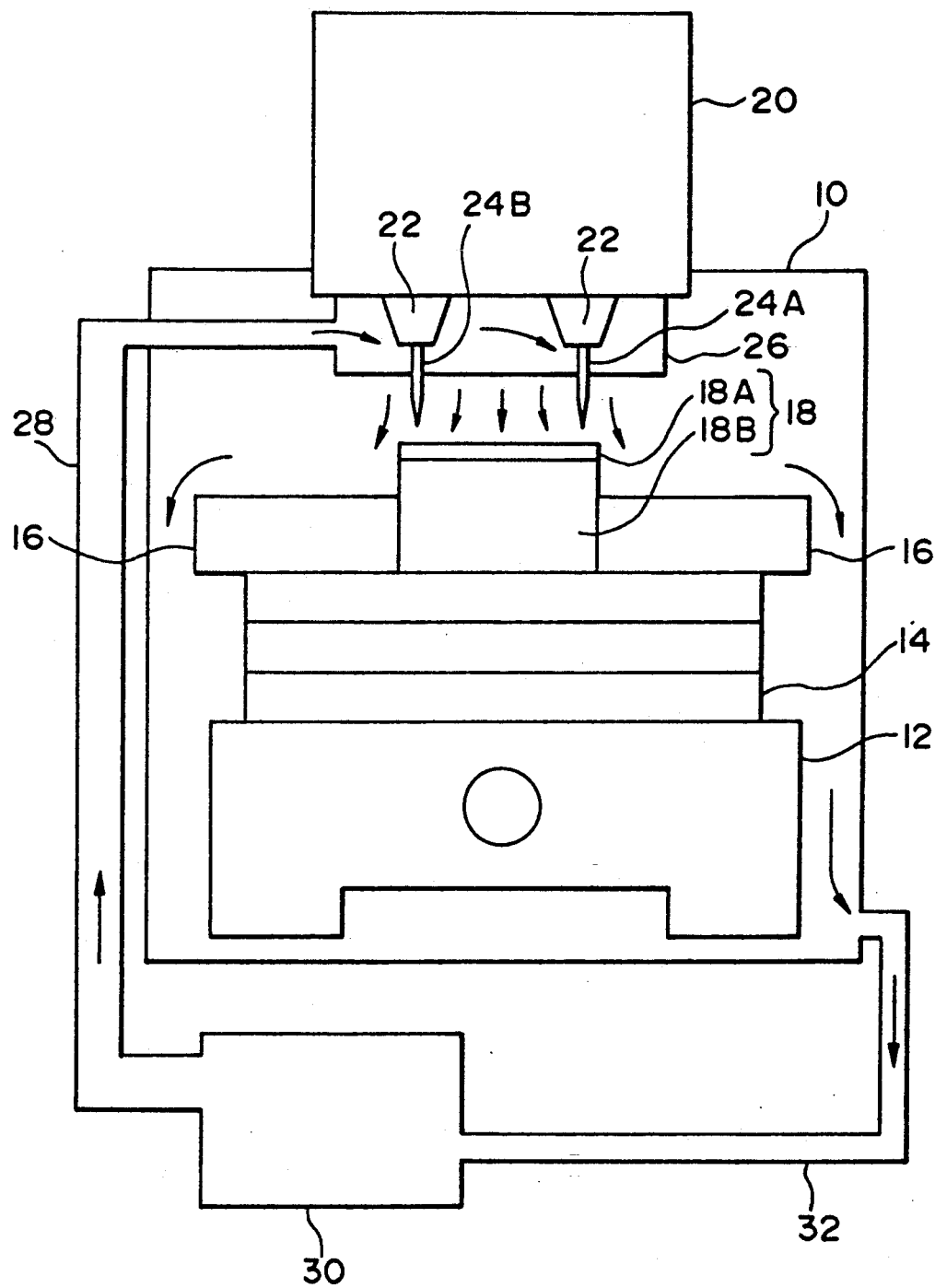
FIG. 1 is a side view showing one embodiment of a rubber stamp manufacturing device according to the present invention.

FIG. 1 is a configuration of one embodiment of the rubber stamp manufacturing device according to the present invention.

In the figure, reference numeral 10 is an airtight casing inside of which an X-Y table (X-Y-direction movement mechanism) 12 is arranged horizontally. On this X-Y table 12, an elevator drive device (Z-direction movement mechanism) 14 is arranged, on which a chuck (stamp body retaining mechanism) 16 is attached to pick up with a pair of claws and fix a rubber stamp body 18 to be engraved. The rubber stamp body 18 in this example is a sheet rubber material 18A fixed on a support 18B, moved in the horizontal directions by means of the X-Y table 12, and moved also in the vertical direction by means of the elevator drive device 14. The rubber stamp body 18 may be constructed entirely of rubber material.

On the one hand, the casing 10 is disposed with a cutter rotating mechanism 20 in the upper part of the chuck 16. This cutter rotating mechanism 20 is disposed with a pair of chucks 22 on its lower face, these chucks 22 being mounted with a coarse processing cutter 24A and a finishing cutter 24B facing directly downward. These cutters 24A, 24B have a sharp tip, which is rotated at a high speed to engrave the rubber material 18A.

Figure 2:
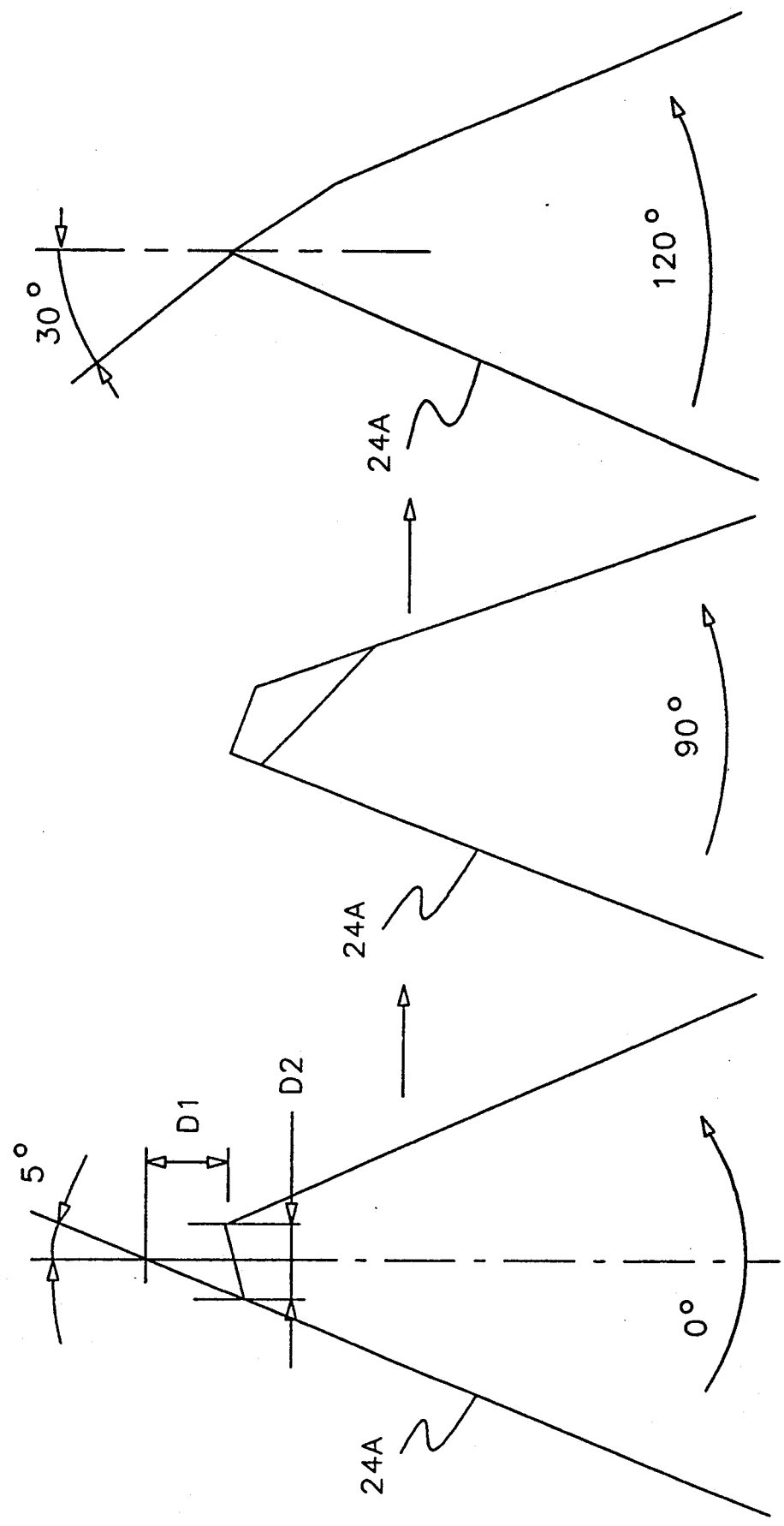
FIG. 2 is a drawing illustrating one example of the cutter used in the device.
Figure 3:
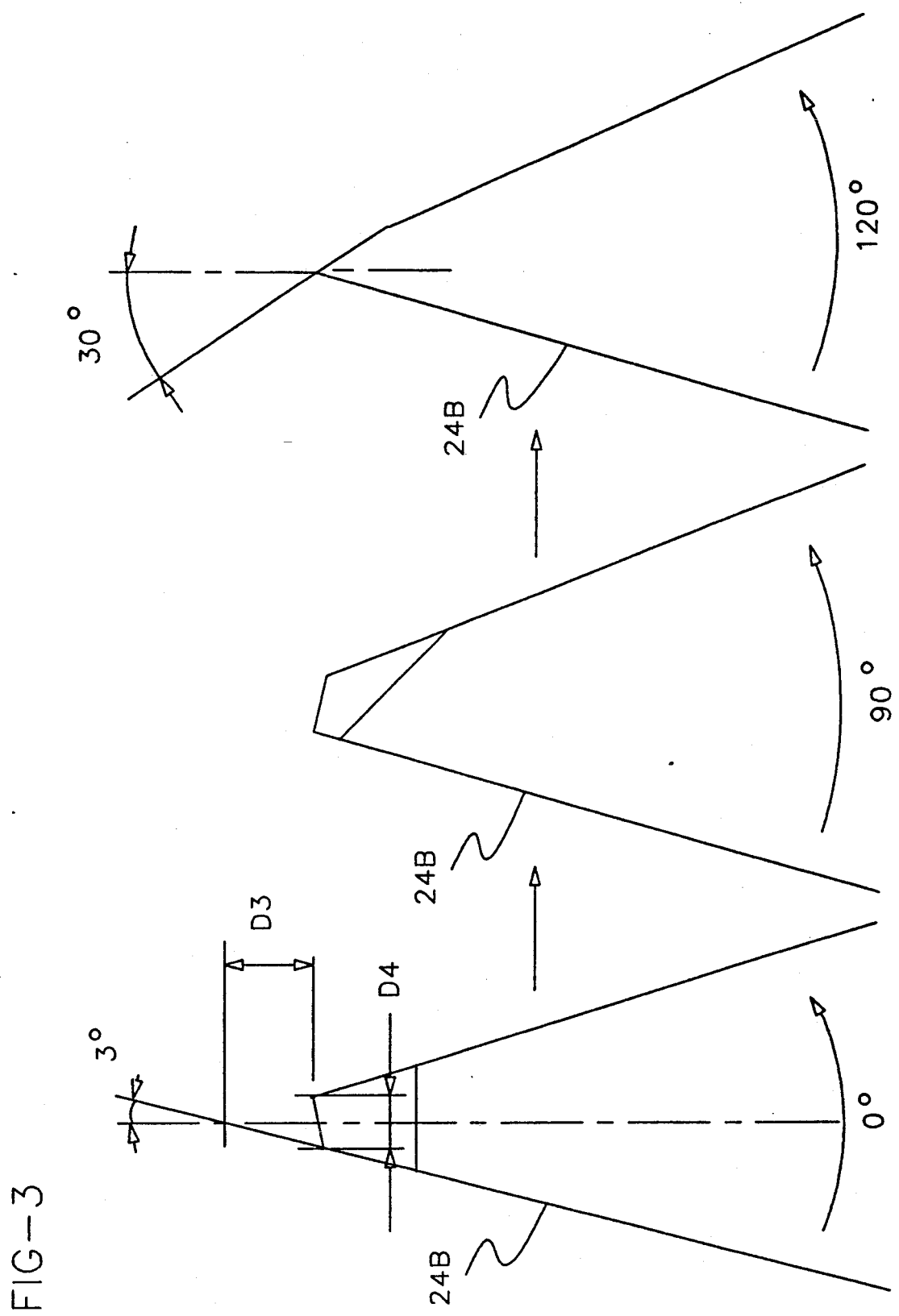
FIG. 3 is a drawing illustrating one example of the cutter used in the device.

FIGS. 2 and 3 are expanded views of the blade tip of one example of the coarse processing cutter 24A and the precision processing cutter 24B as seen from three angles. These cutters 24A, 24B are cutters that have been used conventionally on stamp bodies of hard materials other than rubber stamps, and are not a feature of the present invention. The cutters usable in the present invention should not be limited to the shapes and dimensions as illustrated, but may be changed accordingly as required.

The engraving machine 20 has on its lower face a cover 26 fixed to cover the chucks 22 and the cutters 24A, 24B halfway up. This cover 26 has, on its lower face, insertion holes formed to protrude tips of the cutters 24, and a large number of jet holes are formed in a location that can face the rubber material 18A. The cover 26 is connected to a cooling machine (cooling mechanism) 30 via a duct 28, the cooling machine 30 being further connected to the lower part of the casing 10 via a duct 32. With these arrangements, the air in the casing 10 is cooled by the cooling machine 30, sent into the cover 26, and blown onto the rubber material 18A through the jet holes and insertion holes.

The cooling machine 30 cools the rubber material 18A to a temperature lower than its glass-transition temperature. Since the glass-transition temperature varies widely depending on the rubber material, the cooling capacity of the cooling machine 30 is controlled according to the material. More specifically, a glass-transition temperature is in general either a temperature at a point of inflection at which the dynamic elasticity of a substance begins to decrease (intersection of gradient tangents) or a temperature that shows a maximum value of loss of elasticity. However, in the case of the rubber material dealt with in the present invention, the point of inflection is observed at two points, and moreover, the variation of the dynamic elasticity below the glass-transition point is indistinct. Therefore, in this specification, the glass-transition temperature is defined as a temperature at which the loss of elasticity has reached its maximum.

The rubber material 18A used in the present invention should preferably have a glass-transition temperature higher than −50 degrees Celsius. If the glass-transition temperature is lower than −50 degrees Celsius, the cooling machine 30 should be more elaborate, raising the cooling cost. Materials for the rubber material 18A, specifically speaking, may include butadieneacrylonitrile rubber (NBR), styrene-butadiene rubber (SBR), and butadiene rubber (BR). In the case of NBR, for example, the glass-transition point can be adjusted from −80 degrees Celsius to about +20 degrees Celsius by means of varying the content of acrylonitrile or other additives.

Figure 4:
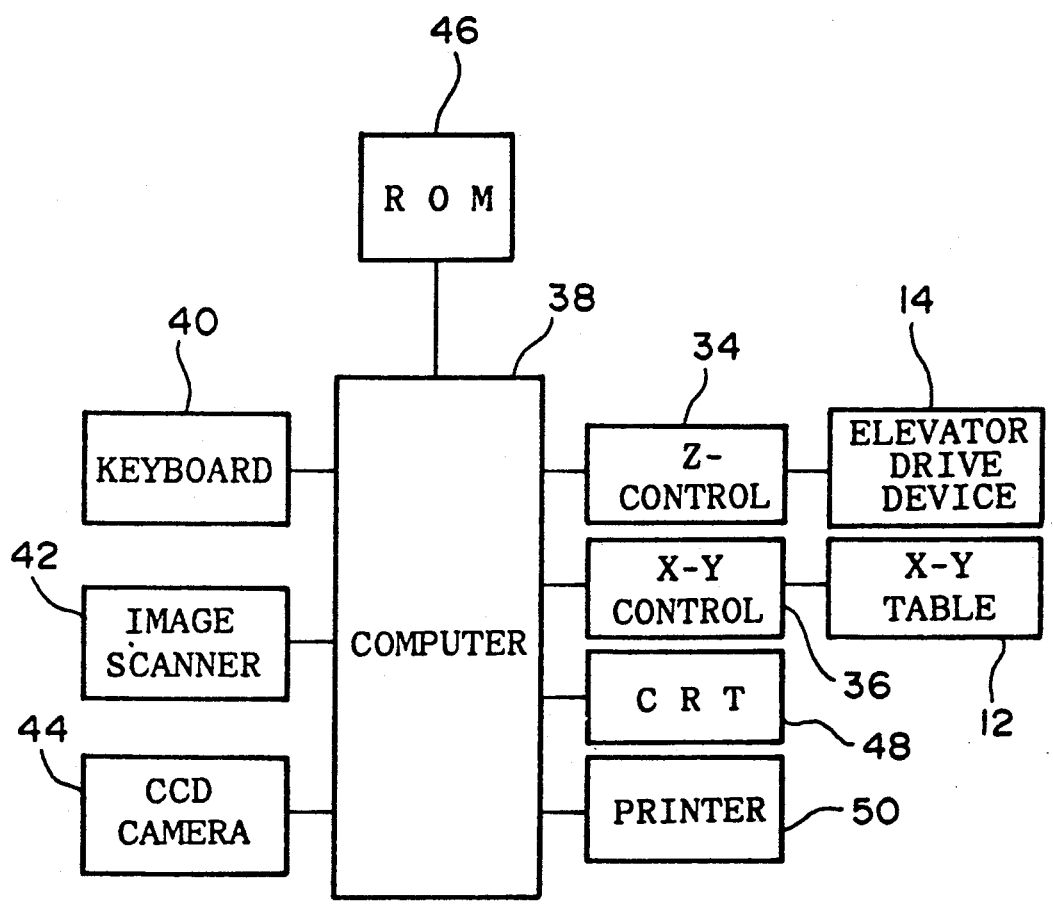
FIG. 4 is a block diagram showing the configuration of the device.

FIG. 4 is a block diagram showing the entire configuration of this device. The elevator drive device 14 is connected to a computer 38 via a Z-axis control 34, and the X-Y table 12 is connected to the computer 38 via an X-Y control 36. The computer 38 is connected with a keyboard 40 as an input device, an image scanner 42, a CCD camera 44, and ROM 46 (dictionary recording device), as well as with a CRT 48 to indicate images and a printer 50, both as output devices. The keyboard 40, image scanner 42, CCD camera 44, and ROM 46 are used as means to input the image information to be formed on the rubber material 18A. The keyboard 40 is used also as a means to input the percentage of shrinkage of the cooling shrinkage associated with the cooling of the rubber material.

The computer 38 has in its inside a contracting converter to convert the image information input from the image inputter into contracted image information according to the percent of cooling shrinkage input from the percent of shrinkage inputter. The X-Y control 36 and the Z-axis control 34 receive the contracted image information sent from the contraction conversion means to engrave the contracted image on the rubber material 18A.

Figure 5:
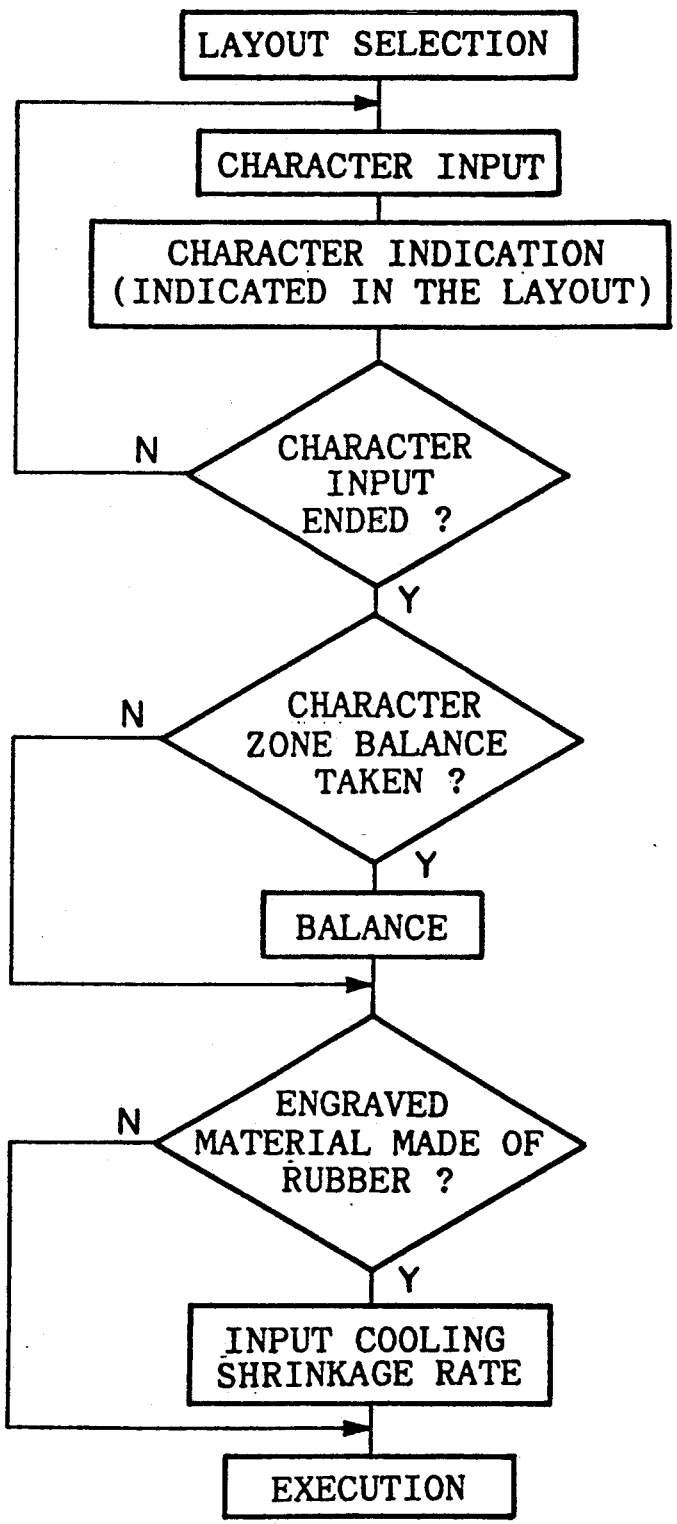
FIG. 5 is a flow chart showing the operation of the device.

FIG. 5 is an operational block diagram for this equipment. In this program, a variety of layouts to form contours of the images is first indicated on the CRT 48. An operator selects any one of the layouts through operating the keyboard 40, inputs the dimensions, and inputs from the keyboard 40 letters (in, for example, KATAKANA, the Japanese syllabary) which are to form the image, and then selects the letter type of the image. The computer 38 calls the letter information from the ROM 46 to carry out a KATAKANA-to-KANJI (Japanese phonetic representation-to-Japanese character) conversion in the selected letter type.

The ROM 46 has Japanese characters of various fonts, foreign characters of various kinds, and layout data recorded in it. Any character or picture that is not recorded on ROM that may be required can be inputted from the image scanner 42 and the CCD camera 44.

The character information thus inputted is compounded with the layout information on the same screen and is indicated by the CRT 48. If the layout information and the character information are not in good balance, the layout can be altered by means of moving, contracting, or expanding the character image through operating the keyboard 40 again. The image and the image information are thus produced.

Next, whether the stamp body material to be engraved is rubber or not is selected by the keyboard 40, and if the stamp body 18 is of rubber, its percent of cooling shrinkage is input. The percent of cooling shrinkage is a dimensional shrinkage when the rubber material 18A is cooled from the normal temperature to the engraving temperature, which is measured by separately. The dimensions of the image are contracted according to the percent of cooling shrinkage, and the contracted image information is calculated. Such a treatment is carried out because if the cooled rubber material 18A is engraved based on the image information, the dimensions will be larger than the desired dimensions when the material has returned to the normal temperature.

On the one hand, the cooling machine 30 is operated to cool the air in the casing 10 below the glass-transition temperature; the cool air is blown onto the rubber material 18A from the cover 26 to harden the material by making its temperature lower than the glass-transition point, and the cutters 24 are also cooled. When the rubber material 18A is sufficiently cooled, the cutters 24A and 24B are rotated, the elevator drive device 14 is operated based on the contracted image information, and the X-Y table 12 is operated via the X-Y control 36. This moves the stamp body 18 three-dimensionally and engraves the image on the rubber material 18A by selectively using the cutters 24A and 24B.

According to the experiments carried out by the inventors, it was found that the cutter rotation speed should preferably be about 20,000–50,000 rpm. With a rotation below 20,000 rpm, the cutter occasionally broke due to the insufficient rotation speed. A rotation speed higher than 50,000 rpm generated a greater amount of friction heat, and it may therefore not be possible to maintain the rubber material 18A at a sufficiently low temperature. The depth of engraving by the cutters 24A, 24B should preferably be 0.3-2.0 mm. A depth less than 0.3 mm will not provide clear images, and engraving deeper than 2.0 mm will greatly increase the possibility that the cutters will break. However, the rotation speed and the engraving depth may be changed if the cutter performance and the machine precision are improved.

With the rubber stamp manufacturing device of the above configuration, which performs engraving with rotating cutters 24A, 24B while having the cooling machine 30 cool the rubber material 18A below the glass-transition temperature to harden the material, such a problem that the rubber slips away from the cutters 24A, 24B because of its elastic deformation, resulting in inaccurate engraving can be prevented, and the engraving can be performed efficiently. Therefore, the productivity of rubber stamp production is greatly enhanced, and production costs may be reduced.

In addition, since this device is controlled by a computer, a rubber stamp can be manufactured at the very time an order is received from a customer, making it possible to complete an engraving within from several minutes to ten or so minutes even for, for example, an address stamp with a relatively large number of letters.

Furthermore, since in this device the percent of cooling shrinkage of the rubber material 18A is input into the computer 38, which reduces or contracts the dimensions of the image information by multiplying this percent of cooling shrinkage, and calculates the contracted image information, so that the rubber material 18A is engraved based on this contracted image information, the image expands to the desired dimensions when the rubber material 18A has returned to the normal temperature. Therefore, the engraving can be performed at an accuracy not different from the case where a stamp body made of hard material is used.

Air curtain equipment may be used in place of the casing 10, with which the cooled air from the cooling machine 30 is enclosed around the rubber material 18A by means of an air flow to cool the rubber material 18A. This makes the work easier than with the casing 10 because operations can be performed through the air curtain.

With the device of the above embodiment, a hard material other than that for a rubber stamp may be engraved by not operating the cooling machine 30.

While in the above-mentioned embodiment air was used as the cooling medium, the present invention should not be limited thereto, but in addition, such gases as freon gas and carbonic acid gas or a liquid may be used as the cooling medium, or such methods without using these types of media may be used by engraving the stamp body with the rubber stamp body placed on a cooled body, or by placing such a cooling material as dry ice on the rubber stamp body, or by installing the whole engraving machine in a freezing chamber in which the engraving is performed in a cooled environment.

Furthermore, when using the device of the present invention, it is not necessary to keep cooling the rubber stamp body 18 during the engraving work. The rubber stamp body 18 may be sufficiently cooled, and then engraved before the temperature of the rubber material 18A has risen above the glass-transition temperature, or engraved with a coolant blown on to the rubber material 18A intermittently, as described later in another embodiment.

Figure 6:
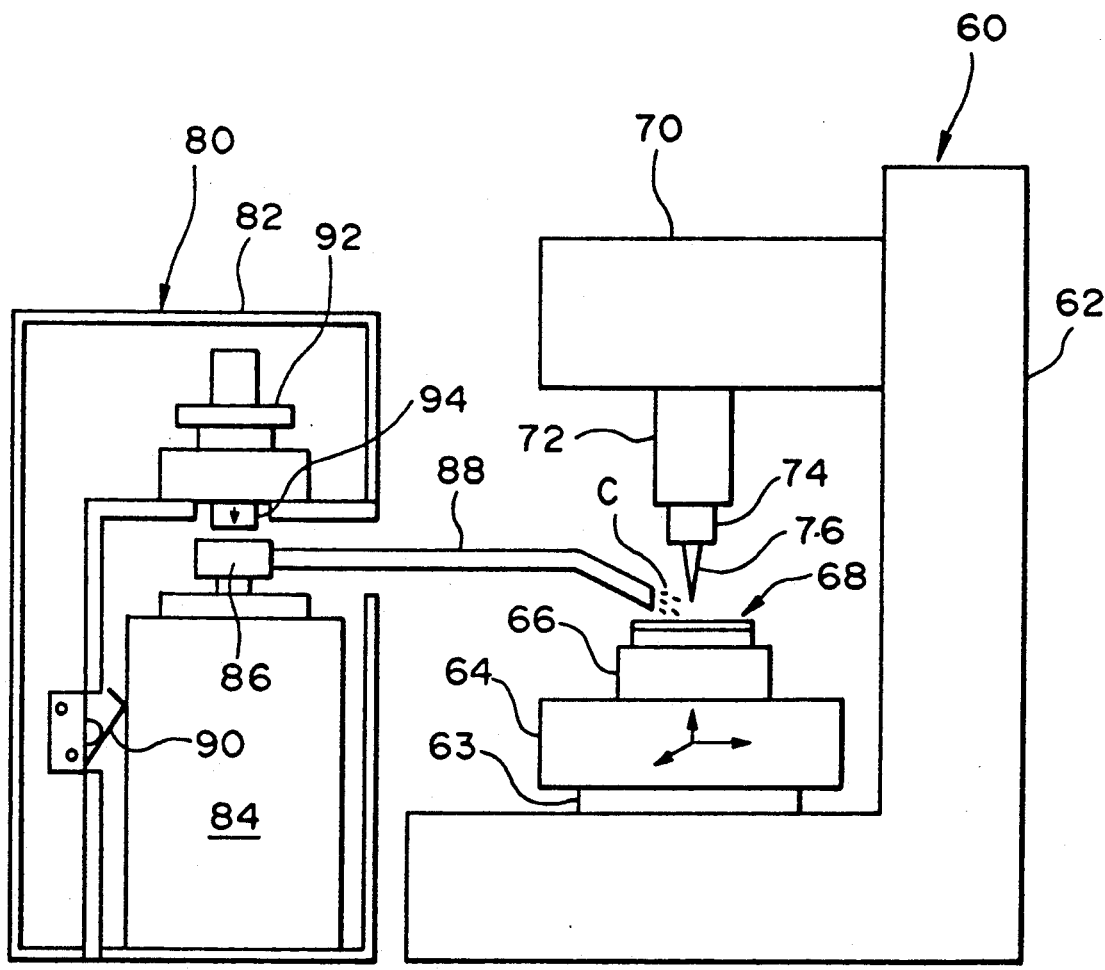
FIG. 6 is a side view showing another embodiment of the rubber stamp manufacturing device according to the present invention.
Figure 7:
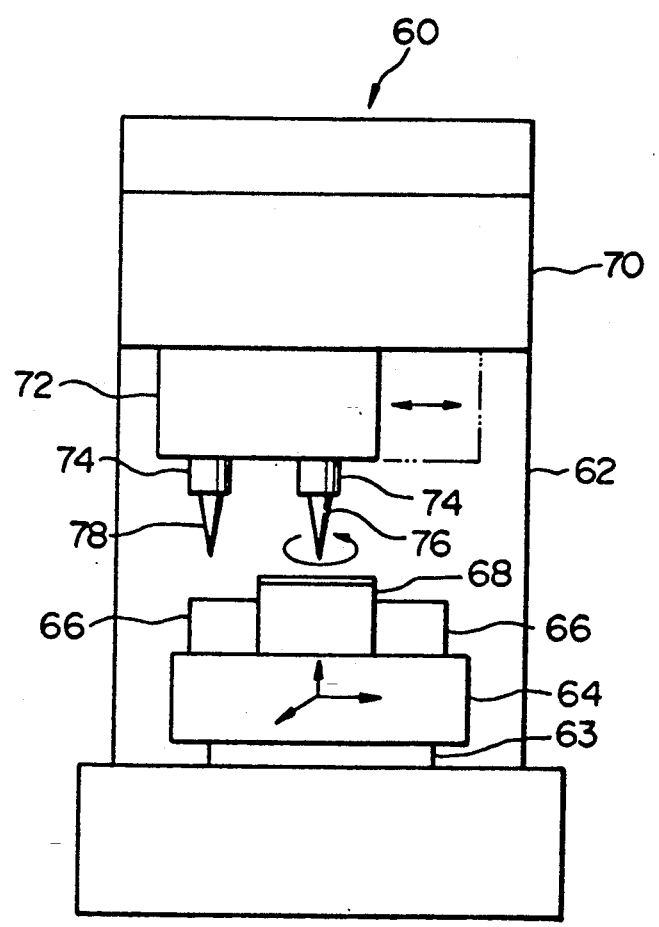
FIG. 7 is a side view showing an engraving machine of the device.

Next, FIGS. 6 and 7 show a side view and a plan view of the essential part of the rubber stamp manufacturing device of another embodiment according to the present invention, the device being disposed with an engraving machine 60 and a cooling machine 80.

The engraving machine 60 has an L-shaped pedestal 62, on which an X-Y table (X-Y-direction movement mechanism) 64 is arranged via an elevator drive device (Z-direction movement mechanism) 63. A pair of stamp body fixing jigs (stamp body retaining mechanisms) 66 is installed so as to be variably positioned on the X-Y table 64, and a rubber stamp body 68 is sandwiched between these stamp body fixing jigs 66. This rubber stamp body 68 is discussed later in this specification.

An overhang 70 is disposed above the X-Y table 64, and a cutter support 72 is installed below the overhang 70. This cutter support 72 can move horizontally between two points by means of a drive device (not shown) accommodated in the overhang 70. Two motors 122 (see FIGS. 8 and 9) are housed in the cutter support 72, each motor rotating a pair of cutter fixing sections 74 that protrude from the lower face of the cutter support 72.

Each cutter fixing section 74 has a coarse processing cutter 76 and a precision processing cutter 78 which can be dismounted and which are similar to the cutters 24A, 24B shown in FIGS. 2 and 3. Either one of the cutters is made to face toward the stamp body 68 by switching the position of the cutter support 72 with the drive device. Such a configuration may used in which the cutters 76, 78 are moved in three axial directions with the rubber stamp body 68 fixed, and the number of cutters may be one, or more than three. Such a configuration may be used in which an elevator is disposed on the cutter support 72 to enable the cutter support 72 to move only vertically, or a configuration may be used in which no elevator is disposed on the X-Y table 64. In this case, the cutters 76, 78 are switched by moving the stamp body 68 using the X-Y table 64.

On the one hand, the cooling machine has a casing 82 housing a coolant container 84, as shown in FIG. 6, the casing 82 having disposed in its interior a switch 90 and drive device 92. The coolant container 84 is filled with coolants that vaporize at normal temperature and normal pressure such as freon gas, carbonic acid gas, liquid nitrogen, and dinitrogen monoxide, and jets the coolant C onto the stamp body 68 from a nozzle 88 when a valve (open-close valve) button 86 is depressed.

The switch 90 is installed on the side of the coolant container 84. The switch 90 turns on when the coolant container is present in the casing 82, and turns off when it is not present. The drive device 92 has a movable part 94 which is driven by an electromagnet (not shown), the electromagnet being connected to a timer (not shown) via the switch 90. When this timer is operated, the electromagnet is energized for a short time (several seconds, for example) after every nonoperational interval (several tens of seconds, for example), by which the movable part 94 protrudes downward to depress the valve button 86.

Figure 8:
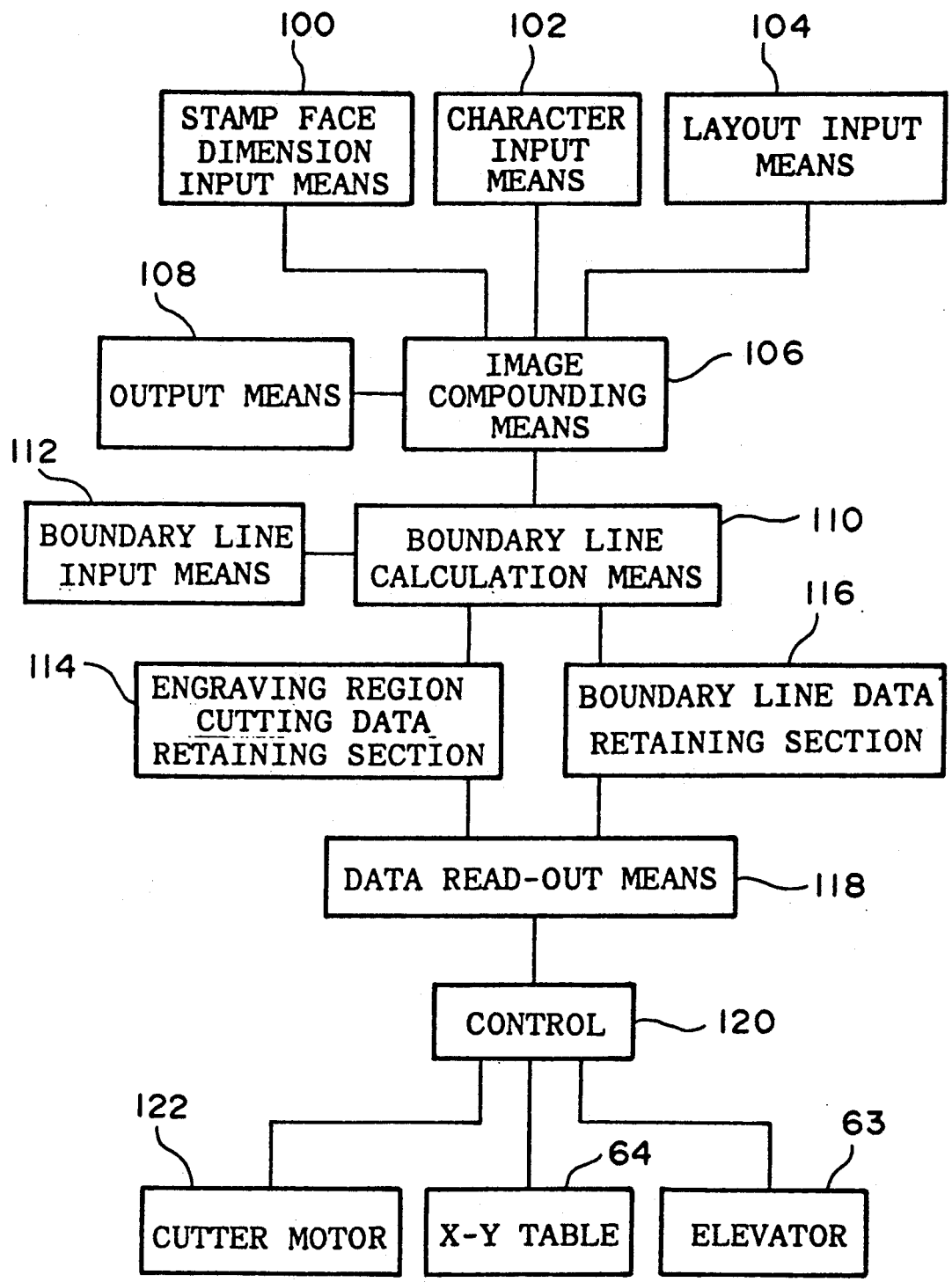
FIG. 8 is a block diagram showing the entire configuration of the device.
Figure 9:
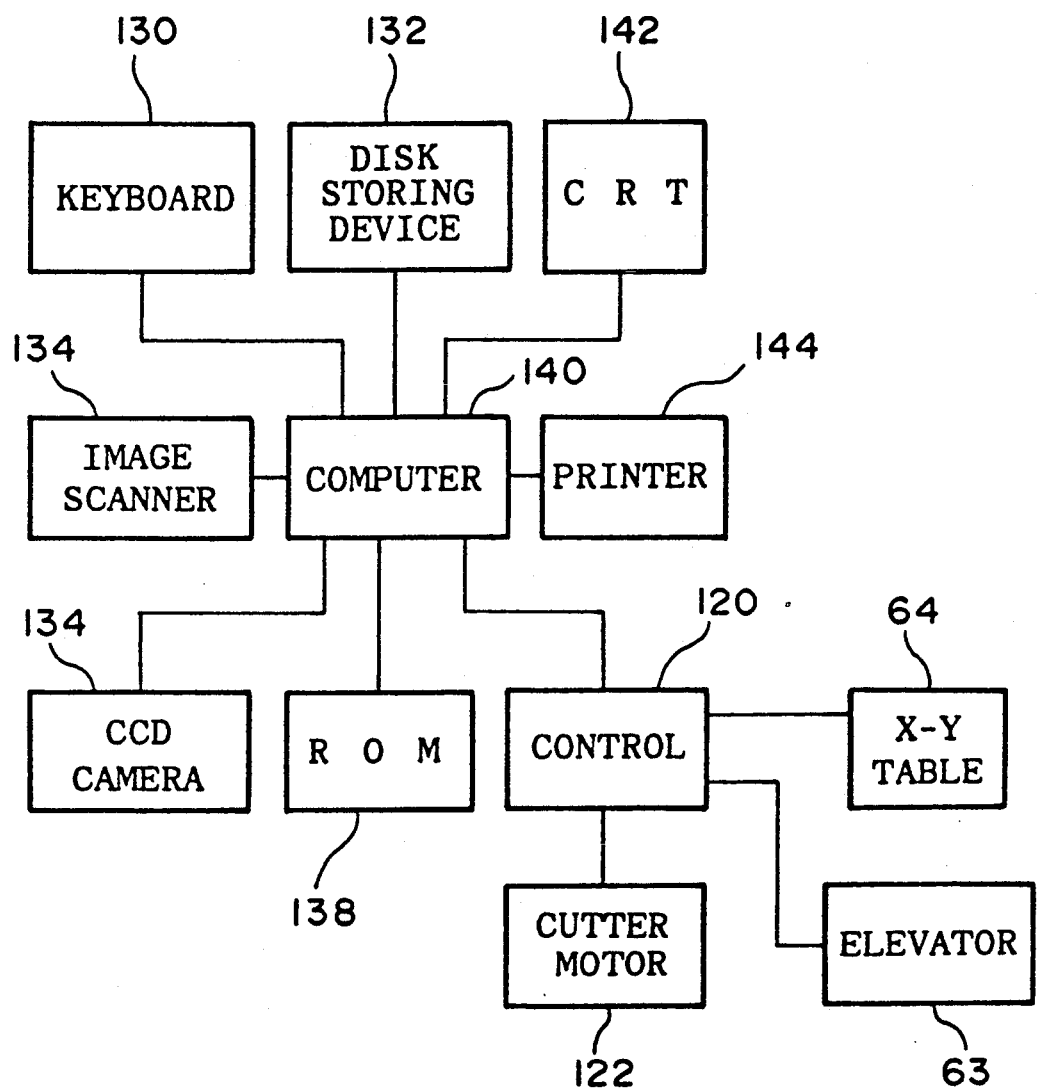
FIG. 9 is a block diagram showing the entire configuration of the device in greater detail.

FIG. 8 is a block diagram showing the entire configuration of the device of this embodiment, and FIG. 9 is a descriptive drawing to illustrate one example of the specific configurations to realize the above block diagram.

This device is disposed, as shown in FIG. 8, with a stamp face dimension inputter 100 to input the stamp face dimensions of the rubber stamp body 68 to be engraved, a character inputter 102 to input characters to be engraved, and a layout inputter 104 to input the layout of the characters, the character inputter 102 and the layout inputter together being referred to as the image inputter. Every piece of information input from the inputters 100, 102, and 104 is transmitted to an image compounder 106. The image compounder 106 compounds each piece of information, and outputs the compounded image through an outputter 108.

The stamp face dimension inputter 100, the character inputter 102, and the layout inputter 104 consist, as specifically shown in FIG. 9, of a keyboard 130, a disk storage device 132, an image scanner 134, a CCD camera 136, and a ROM 138. The disk storage device 132 and the ROM 138 have general dictionary information initially stored, and the image scanner 134 and the CCD camera are used to read in the images from external sources. The outputter 108 comprises a CRT 142 and a printer 144.

Again, in FIG. 8, the information for the images compounded in the image compounder 106 is transmitted to a boundary line calculator 110. This boundary line calculator 110 is used to calculate positional data for a boundary line between the engraving region on which the images are to be formed on the stamp face and the blank region which is the region other than the engraving region.

Specifically speaking, the boundary line calculating means 110 designates as the engraving region the area within the predetermined distance from around each image unit (individual characters, pictures and frame lines, for example), and if the adjoining engraving regions are superposed, or if the clearance between them is below a preset value, designates the adjoining regions as one continuous engraving region. Then, it determines the position of the boundary line that demarcates each engraving region from the blank region.

The setting value for the clearance is such that peeling off a peelable layer 154 (FIGS. 10-12) reduces the processing time compared to the case in which a blank region is provided between the adjoining image units and the peelable layer 154 on this blank region is peeled off. Meanwhile, the boundary line calculating means 110 is disposed with a boundary line input means 112, from which the boundary line positional data can be input directly.

The boundary line positional data calculated by the boundary line calculating means 110 are stored in a boundary line data retaining part 116. The information for the images within the engraving region is stored in an engraving region cutting data retaining part 114. These data retaining parts 114 and 116 are connected to a data read-out 118, the data read-out 118 reading out each piece of information from the data retaining parts 114 and 116, and transmitting the information to a control 120. The above-mentioned image compounder 106, the boundary line calculator 110, the data retaining parts 114 and 116, and the data read-out 118 are structured in a computer 140 as shown in FIG. 9.

The control 120 simultaneously controls a cutter driving motor 122, the X-Y table 64 and the elevator 63. In a cutting operation, the control 120 cuts the area other than the images within the engraving region on the rubber stamp body 68 to a first constant depth based on the engraving region cutting data supplied from the data read-out 118 (see numeral 164 in FIG. 12). Then, the control 120 cuts the stamp face to a second depth which is deeper than the first depth, along the boundary line based on the boundary positional data (see numeral 168 in FIG. 12). These first and second depths are determined by the construction of the rubber stamp body 68 as explained below.

Figure 10:
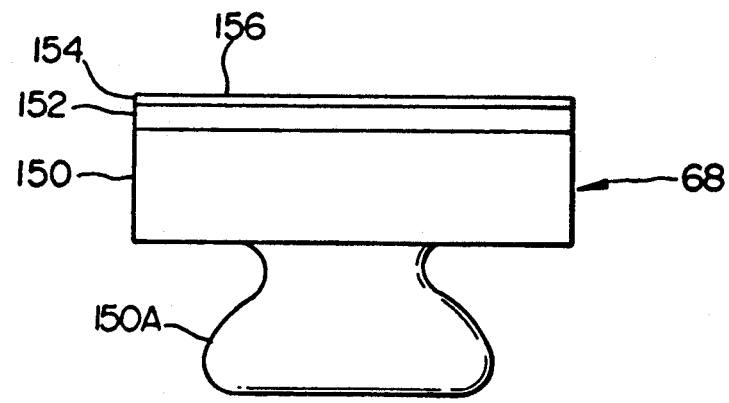
FIG. 10 is a side view showing one embodiment of a rubber stamp body according to the present invention.
Figure 11:
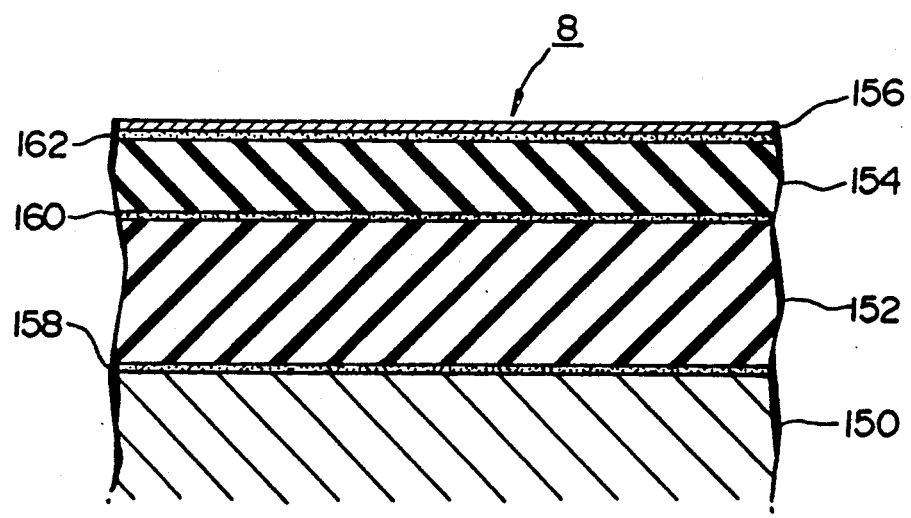
FIG. 11 is an expanded cross sectional view showing the vicinity of a peelable layer in the rubber stamp body.

FIG. 10 is a side view showing one embodiment of the rubber stamp body 68 according to the present invention, and FIG. 11 is an expanded view of the vicinity of the stamp face. This rubber stamp body 68 consists of a cushion layer 152, a peelable layer 154 and a protective film 156 affixed in that order on the edge of a main stamp body 150 made of a hard material, having a holding part 150A. The stamp body 68 should not be limited to the shape as shown, but may be of any other shape.

The cushion layer 152 is formed of various kinds of rubber which have been used conventionally for a rubber stamp body, or of soft plastics such as polyurethane foam, and is bonded permanently on the main stamp body 150 via an adhesive layer 158, as shown in FIG. 11. The cushion layer 152 is provided to give a stamp a cushioning effect when it is pressed on the paper, the thickness thereof being not limited to, but preferably, 1 to 3 mm.

The peelable layer 154 is, as in the above-mentioned rubber material, formed of a rubber of which the glass-transition temperature is higher than −50 degrees Celsius, preferably between −10 degrees Celsius and +10 degrees Celsius, and is bonded temporarily on the cushion layer 152 via the adhesive layer 160.

If the glass-transition temperature is lower than −50 degrees Celsius, a large quantity of coolant will be required to harden the peelable layer 154, raising the cost, and moreover, the contraction in the peelable layer 154 is increased at hardening, resulting in increased dimensional errors in engraving. If the glass-transition temperature is too high, the stamp face is excessively hard, making stamping on paper more difficult.

For the adhesive layer 160, a double sided adhesive that has stronger adhesive strength for the peelable layer 154 than for the cushion layer 152 is suitable. In this way, in peeling the peelable layer 154, the adhesive layer 160 can be peeled off completely from the cushion layer 152 with itself adhered on the peelable layer 154, without having remained on the cushion layer 152. In order to make the adhesive strength of the peelable layer 154 greater than on the cushion layer 152, different adhesive strengths may be provided on the sides of the adhesive layer 160, or alternatively, the rear side of the peelable layer 154 may be made rough, and the surface of the cushion layer 152 may be made smooth to achieve the intended effect.

The thickness of the peelable layer 154 is preferably 1-2 mm (but is not limited to this range). If the peelable layer 154 is thinner than 1 mm, it will be difficult to cut it precisely down to the central part in the thickness direction as indicated at 164. If it is thicker than 2 mm, it will be difficult to cut the peelable layer 154 using the cutter 76. However, this will not apply if the cutter performance is improved.

For the protective film 156, such metal foils as aluminum foil, aluminum alloy film, and titanium foil, or various kinds of plastic films may be used, and the film is bonded to the peelable layer 154 via the adhesive layer 162. The adhesive layer 162 should preferably be peeled off together with the protective film 156, and for this reason, a film with the adhesive layer initially provided with the adhesive layer 162 is preferable.

The thickness of the protective film 156 should preferably be about 40-70 microns, though the ideal thickness depends on the material. If the protective film 156 is thinner than about 40 microns, peeling it off of the peelable layer 154 will be difficult, and it will be harder to prevent burrs. If, conversely, the protective film 156 is thicker than about 70 microns, the cutting of the peelable layer 154 may be disrupted. The protective film 156 made of metal is better at conducting heat over the entire surface of the peelable layer 154, resulting in more uniform cooling of the peelable layer 154.

Next, explanations will be given of one embodiment of a manufacturing method using the above-described manufacturing device for the rubber stamp body 68 and the rubber stamp.

Figure 14:
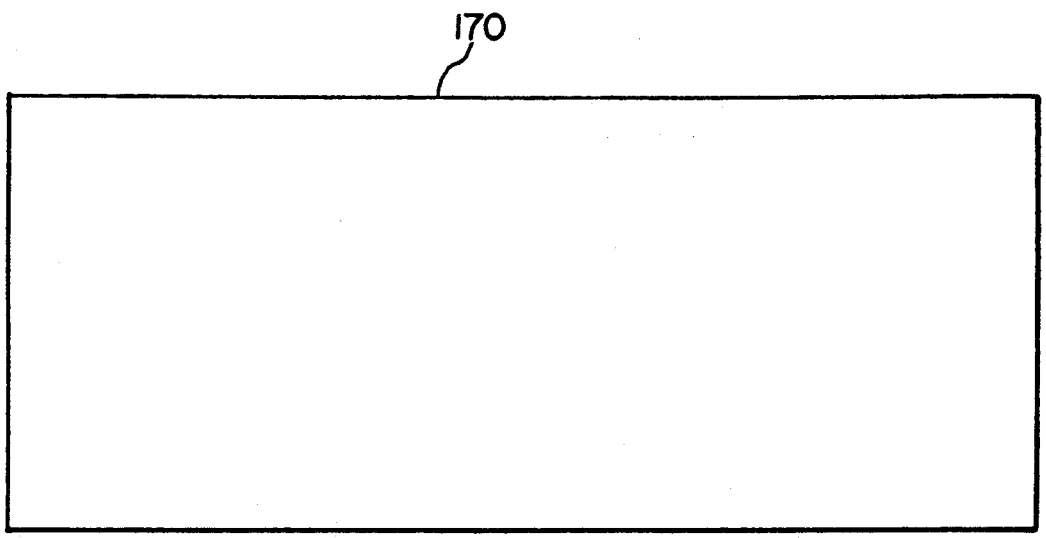
FIG. 14 is an output screen with stamp-face dimension information input in one embodiment of the method for manufacturing rubber stamps according to the present invention.

First, the rubber stamp body 68 is placed on the X-Y table 64 as shown in FIG. 6, with the stamp face facing upward, and is fixed with both sides sandwiched between the stamp body fixing jigs 66. Then, the dimensions of the stamp face on the rubber stamp body 68 are input from the stamp face dimension inputter 100 shown in FIG. 8. Under this condition, a contour 170 only on the stamp face is indicated by means of the outputter 108 as shown in FIG. 14, for example.

Figure 15:
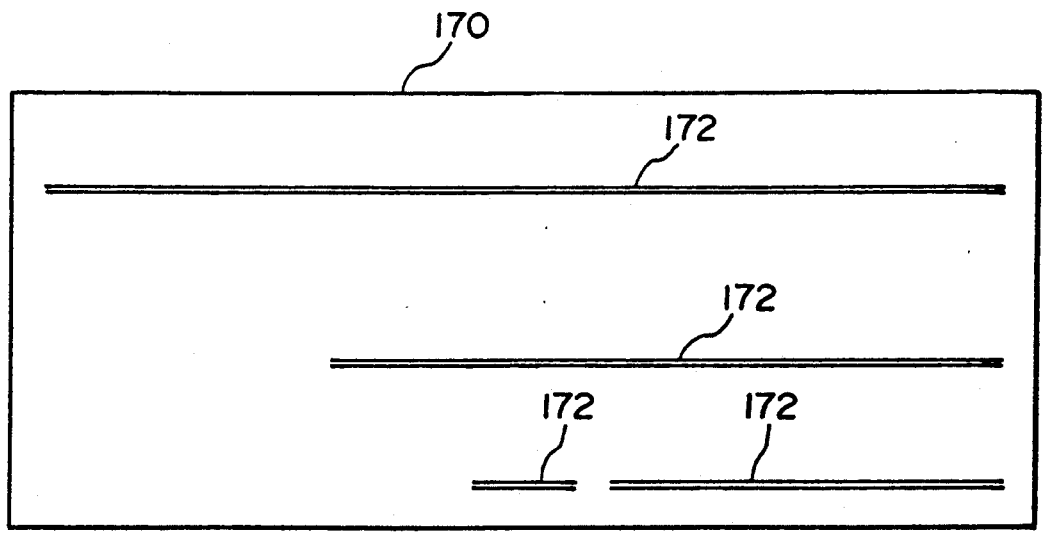
FIG. 15 is an output screen with layout information input in the method for manufacturing rubber stamps.

Subsequently, when the locations on which characters are to be arranged in the stamp face are designated and the layout information is inputted by means of the layout inputter 104, a character input position 172 is indicated within the stamp face contour 170 as shown in FIG. 15, for example. Further, when the character information 174 is input using the character inputter 102 and the layout is modified as required, each item of information is compounded by the image compounder 106 to make the compounded screen as shown in FIG. 16.

The boundary line calculator 110 receives the compounded screen information, designates as the engraving region the area within the predetermined distance from around each image unit (determined by the cutter thickness), and if the adjoining engraving regions are superposed or if the clearance between them is below a preset value, also designates the adjoining regions as one continuous engraving region. It then determines the position of the boundary line 176 between the engraving region and the blank region. If occasion demands, the above automatic calculation of the boundary line may not need be performed, but the position data for the boundary line 176 may be input directly from the boundary line inputter 112. Also, the boundary line 176 is shown as a straight line in this example, but it may be formed by curved lines, as required.

Once the boundary line 176 is determined, the position data is stored in the boundary line data retaining part 116, and the image information is stored within the engraving region in the engraving region cutting data retaining part 114. These data retaining parts 114 and 116, upon receiving commands from the data read-out 118, supply each item of information to the data read-out 118 in a certain sequence following the engraving procedure. Each item of the information is supplied to the control 120 via the data read-out 118, which, upon being given a cutting start command, operates the cutter driving motor 122, the X-Y table 64, and the elevator 63 to cut the rubber stamp body 68 using the cutter 76 or 78.

On the one hand, before starting the cutting, the cooling machine 80 shown in FIG. 6 is operated, whereby the coolant C is blown on the stamp face of the rubber stamp body 68 via the nozzle 88 for each preset period of time by means of the drive device 92. According to the experiment carried out by the inventors, liquefied freon was used as a coolant, and liquefied freon C was sprayed for 3 seconds just before engraving began. Spraying was performed for 2 seconds every 90-second interval thereafter to keep the peelable layer 154 sufficiently cool. The intermittent spraying of the coolant C in this manner can cool the peelable layer 154 more evenly than when the coolant is sprayed in a small quantity continuously, and can save on total coolant consumption. However, the spraying interval and the spraying time may be altered accordingly depending on, for example, the size of the area.

Figure 12:
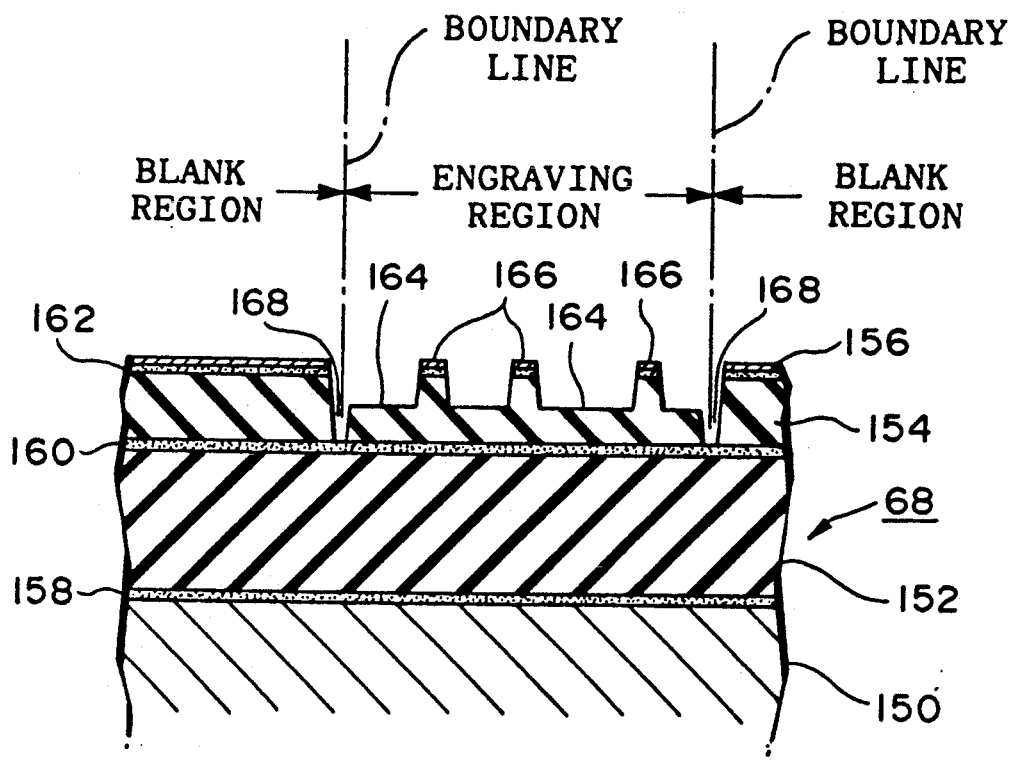
FIG. 12 is an expanded cross sectional view of an engraving region and a boundary line in the rubber stamp body.
Figure 13:
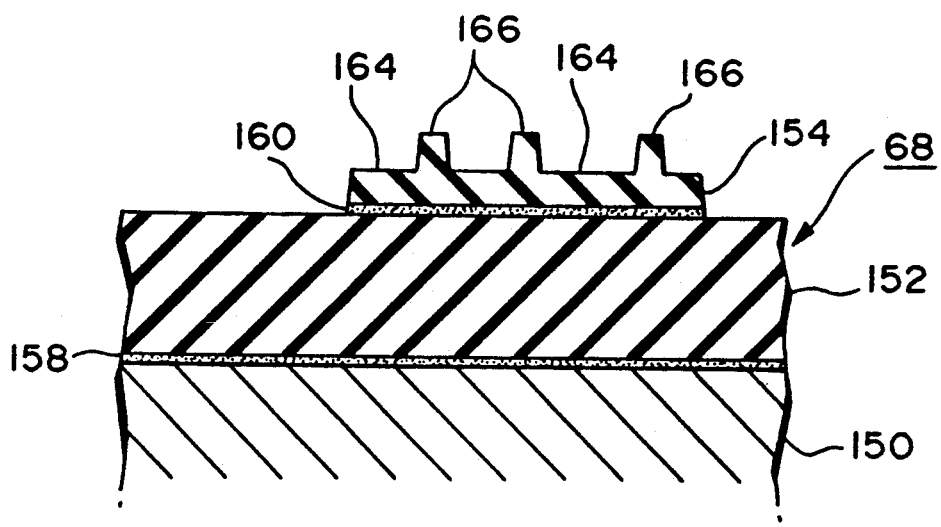
FIG. 13 is an expanded cross sectional view showing a peeled condition of a peelable layer of a blank region in the rubber stamp body.

The cutting operation controlled by the control 120 is carried out as follows. First, as shown in FIG. 12, the engraving region on the inner side of each boundary line 176 (see FIG. 17) is cut, based on the image information within the engraving region, to the first depth using the rotating cutter 76 to remove the surface layers above the areas 164 while leaving the image parts and the image part 166 other than the removed part. The first depth means a depth reaching approximately the center of the peelable layer 154 in the thickness direction.

Then, the peelable layer 154 is cut to the second depth along the boundary lines 176. The second depth is such that the tip of the cutter 76 reaches approximately the cushion layer 152, at which the peelable layer 154 and the adhesive layer 160 are cut off completely bounded by the boundary line 176. The cutting may be performed along the boundary line 176 first, and then on the portions to be removed from above the areas 164 later, or vice versa.

Once the entire stamp face of the rubber stamp body 68 is cut, the cooling machine 80 is stopped, and the rubber stamp body 68 is removed from the X-Y table 64. Subsequently, the peelable layer 154 and the adhesive layer 160 in the blank region are peeled off from the cushion layer 152, followed by peeling of the protective film 156 and the adhesive layer 162 from the image part 166, thus completing the work.

With the rubber stamp body 68 of the above construction, the rubber stamp manufacturing equipment, and the method of manufacturing thereof, the engraving area by the cutter can be limited to the engraving region on the stamp face and can shorten the time required to make a rubber stamp, because the area other than the image in the engraving region is cut to a depth such that the peelable layer 154 is not cut off, and is removed to form the image part 166. The peelable layer 154 is also cut off along the boundary line 176, and the peelable layer 154 in the blank region is peeled off from the cushion layer 152.

In addition to the peelable layer 154 being fixed on the cushion layer 152, it is sufficient that this peelable layer 154 only be cooled, hence minimizing the percent of shrinkage in a direction parallel to the stamp face when the peelable layer 154 is cooled. Therefore, it is possible to carry out the engraving without making a dimensional correction otherwise required because of the cooling shrinkage. However, the cooling shrinkage may be corrected if it is required, in a similar manner as already described.

In addition, when the protective film 156 made of metal is fixed on the peelable layer 154 of the rubber stamp body 68, this protective film 156 effectively distributes the cooling effect of the coolant over the peelable layer 154, enabling the peelable layer to cool uniformly. Moreover, the peelable layer 154 can be kept cooled when the supply of the coolant C is stopped. Furthermore, since the protective film 154 prevents the peelable layer 154 edges from fine chipping damage, or from having burrs generated upon cutting, the image part 166 can be formed with clear and distinct contours.

In the device of this embodiment, because the position of the boundary line 176 is automatically calculated for the cutting, based on the character information, stamp face dimensional information and layout information input from the boundary line calculator 110, the position of the boundary line 176 can be decided most suitably, and the device can be operated easily in addition to minimally suppressing the area of the engraving region.

In addition, while the rubber stamp body 68 is cooled by means of jetting the coolant intermittently in the preceding embodiment, it is possible also in this embodiment to engrave the rubber stamp body with the stamp body arranged in a cooling container lower in temperature than the glass-transition temperature of the rubber stamp body.

Furthermore, while the nozzle 88 in the cooling machine 80 was fixed in position in the preceding embodiment, it is also possible to make a configuration such that a scanning mechanism drives this nozzle 88 to allow the nozzle 88 to scan in the lengthwise direction of the rubber stamp body 68, the nozzle being interlocked with the jetting coolant, whereby the coolant is sprayed over the entire surface of the rubber stamp body 68.

EXAMPLES

Next, experimental examples are presented to verify the effects of the equipment according to the present invention.

A device with the configuration shown in FIG. 1 was fabricated. Engraving was carried out on a cooled rubber stamp body while measuring the surface temperatures.

The rubber stamp bodies used for the experiment were made of butadieneacrylonitrile rubber "B-70", "50-1", and "60-3" (commercial product names) made by Showa Rubber Industrial Co., Ltd., of which the glass-transition temperatures are −33.1 degrees Celsius, −1.2 degrees Celsius and 0.0 degrees Celsius, respectively.

The conditions for and results of the engraving are shown in Table 1.

TABLE 1

| Rubber material | Glass-transition temperature (°C.) | Engraving temperature (°C.) | Results of engraving |
|---|---|---|---|
| B-70 | −33.1 | Normal | Engraving impossible because the rubber slips away from the cutter. |
| B-70 | −33.1 | 0 | Engraving impossible because the rubber slips away from the cutter. |
| B-70 | −33.1 | −8 | Engraving impossible because the rubber slips away from the cutter. |
| B-70 | −33.1 | −50 | Good cutting quality. Production commercialization possible. |
| 50-1 | −1.2 | Normal | Engraving impossible because the rubber slips away from the cutter. |
| 50-1 | −1.2 | 0 | Engraving impossible because the rubber slips away from the cutter. |
| 50-1 | −1.2 | −1.2 | Burrs generated due to cutting quality variance. |
| 50-1 | −1.2 | −50 | Good cutting quality. Production, commercialization possible. |
| 60-3 | 0.0 | Normal | Engraving impossible because the rubber slips away from the cutter. |
| 60-3 | 0.0 | 0 | Burrs generated due to cutting quality variance. |
| 60-3 | 0.0 | −8 | Good cutting quality. Production, commercialization possible. |
| 60-3 | 0.0 | −50 | Good cutting quality. Production, commercialization possible. |

As can be seen from the above table, any of the rubber materials were capable of being engraved like other hard stamp materials when cooled below the glass-transition temperatures.

What is claimed is:

1. A method for manufacturing rubber stamps comprising the steps of:
   (a) preparing a stamp body including a stamp face of a rubber material having a predetermined glass-transition temperature,
   (b) detachably adhering a protective metal foil on said stamp face of said stamp body,
   (c) spraying a coolant against said metal foil for a sufficient period of time to cool said rubber material below said glass-transition temperature thereof,
   (d) engraving said stamp face through said metal foil using a rotating cutter to form a predetermined image and thereby removing those portions of said metal foil overlying the areas of said image,
   (e) maintaining said rubber material below said glass-transition temperature during said engraving step (d),
   (f) repeating said steps (c), (d) and (e) until said image is formed completely, and
   (g) removing the remaining said metal foil from said stamp face.

2. A method for manufacturing rubber stamps according to claim 1 wherein said glass-transition temperature of said rubber material is higher than −50 degrees Celsius.

3. A method for manufacturing rubber stamps according to claim 1 further comprising the steps of:
   calculating the dimensions of said engraved image at the temperature of said engraving steps in accordance with the shrinkage ratio of said rubber material as compared with the dimensions of said image at room temperature, and carrying out said engraving steps according to said calculated dimensions.

4. A method for manufacturing rubber stamps according to claim 1 wherein said metal foil is made from a material selected from Al, Al alloys, Ti and Ti alloys, said metal foil having a thickness of 40–70 microns.

5. A method for manufacturing rubber stamps according to claim 1 wherein said coolant is a liquified gas.

6. A method for manufacturing rubber stamps according to claim 1 wherein the rotation speed of said rotating cutter is in a range of 20,000 to 50,000 r.p.m.

7. A method for manufacturing rubber stamps according to claim 1 wherein said glass-transition temperature of said peelable layer is in a range of −10 to +10 degrees Celsius.

8. A method for manufacturing rubber stamps according to claim 1 wherein said rubber material is butadieneacrylonitrile rubber, styrene-butadiene rubber or butadiene rubber.

9. A method for manufacturing rubber stamps comprising the steps of:

(a) preparing a support body having an elastic and flat surface,
(b) preparing a peelable layer made of rubber having a predetermined glass-transition temperature and having a constant thickness,
(c) detachably adhering said peelable layer on said elastic surface of said support body to form a stamp body with said peelable layer forming a stamp face,
(d) detachably adhering a protective metal foil on said stamp face of said stamp body,
(e) spraying a coolant against said metal foil for a sufficient period of time to cool said peelable layer below said glass-transition temperature thereof,
(f) engraving said peelable layer through said metal foil using a rotating cutter to form predetermined images and thereby removing those portions of said metal foil overlying the areas of said images,
(g) cutting said metal foil and said peelable layer along boundary lines between engraving regions on which said images are to be formed and blank regions other than said engraving regions,
(h) maintaining said peelable layer below said glass-transition temperature during said engraving and cutting steps,
(i) repeating said steps (e), (f), (g) and (h) until said images are formed completely and said boundary lines are cut completely,
(j) peeling said peelable layer from said blank regions of said support body, and
(k) peeling said metal foil from each of said engraving regions of said peelable layer.

10. A method for manufacturing rubber stamps according to claim 9 wherein said glass-transition temperature of said peelable layer is higher than −50 degrees Celsius.

11. A method for manufacturing rubber stamps according to claim 9 wherein said peelable layer has a thickness of 1–2 mm.

* * * * *